Figure 3:
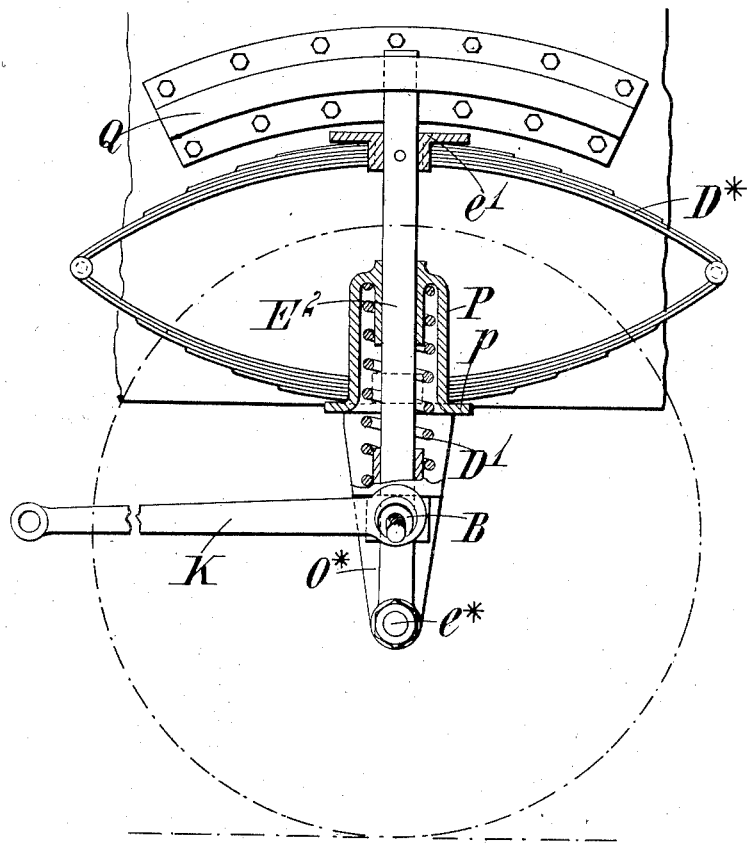

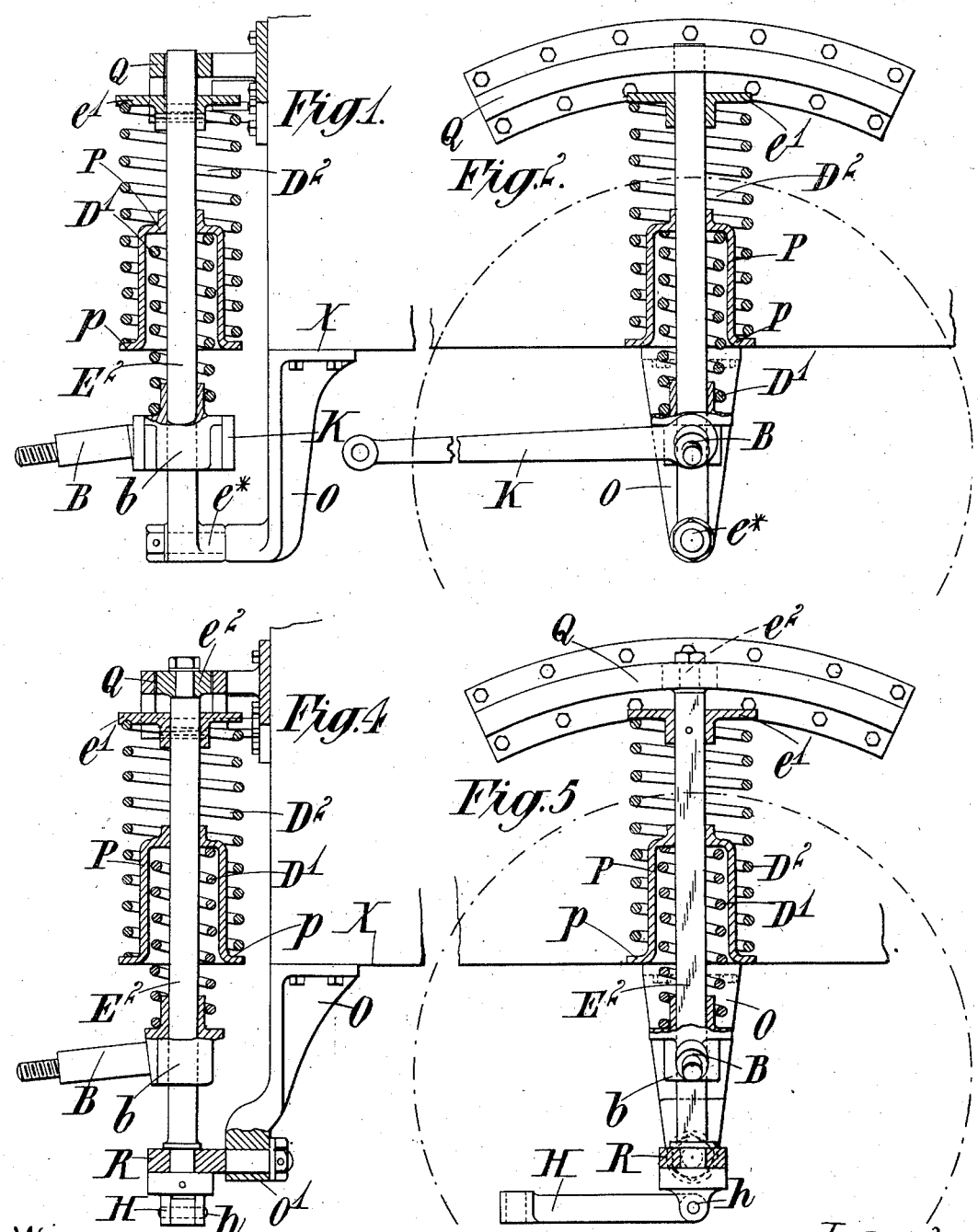

No. 879,160. PATENTED FEB. 18, 1908.
C. W. FULTON.
MOUNTING OF ROAD WHEELS FOR VEHICLES.
APPLICATION FILED MAY 15, 1905.

6 SHEETS—SHEET 2.

Witnesses
Thomas Durant
Melville W. Church

Inventor:
Charles W. Fulton,
by Church & Church
his Attys.

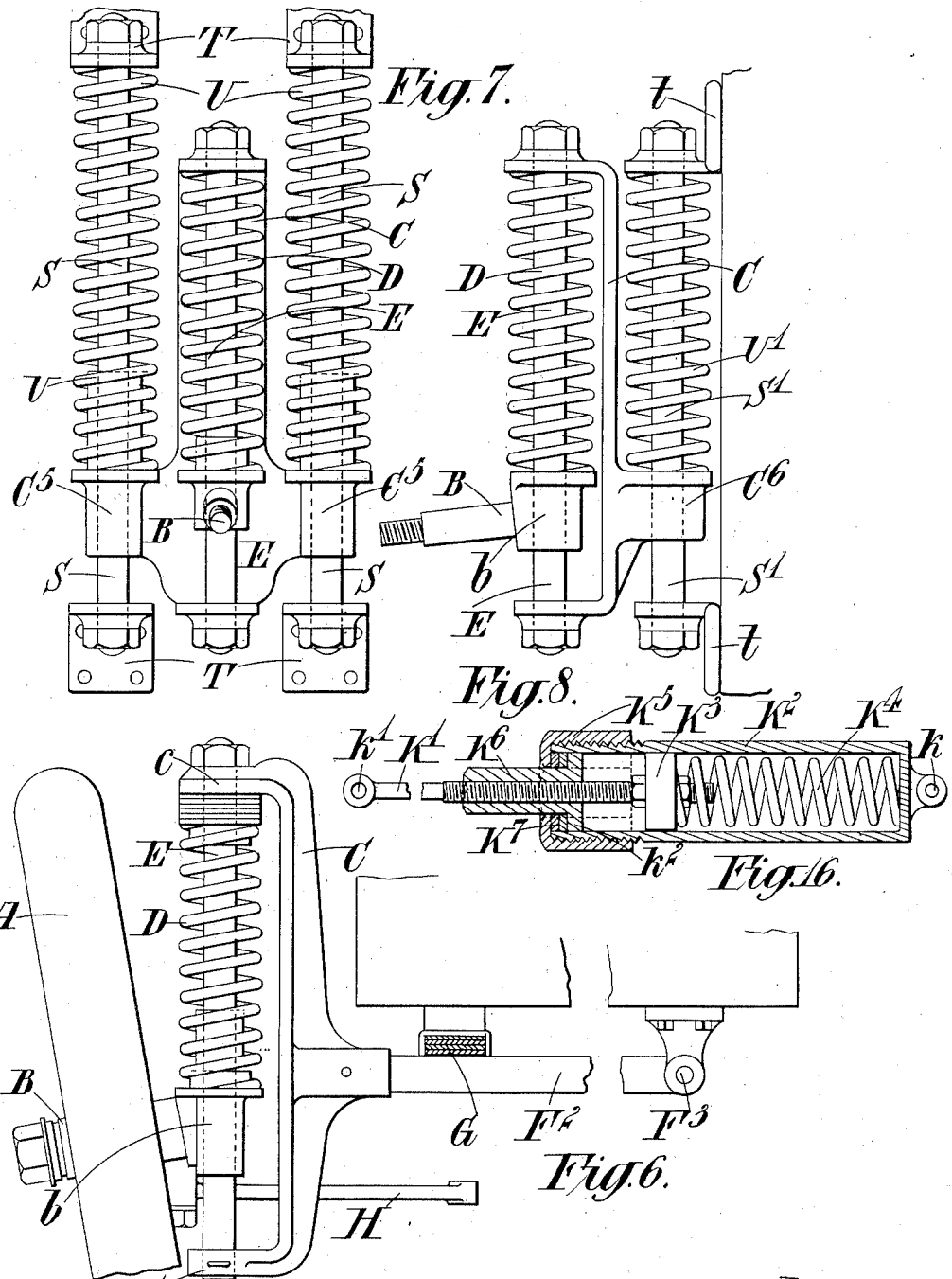

No. 879,160. PATENTED FEB. 18, 1908.
C. W. FULTON.
MOUNTING OF ROAD WHEELS FOR VEHICLES.
APPLICATION FILED MAY 15, 1905.
6 SHEETS—SHEET 4.
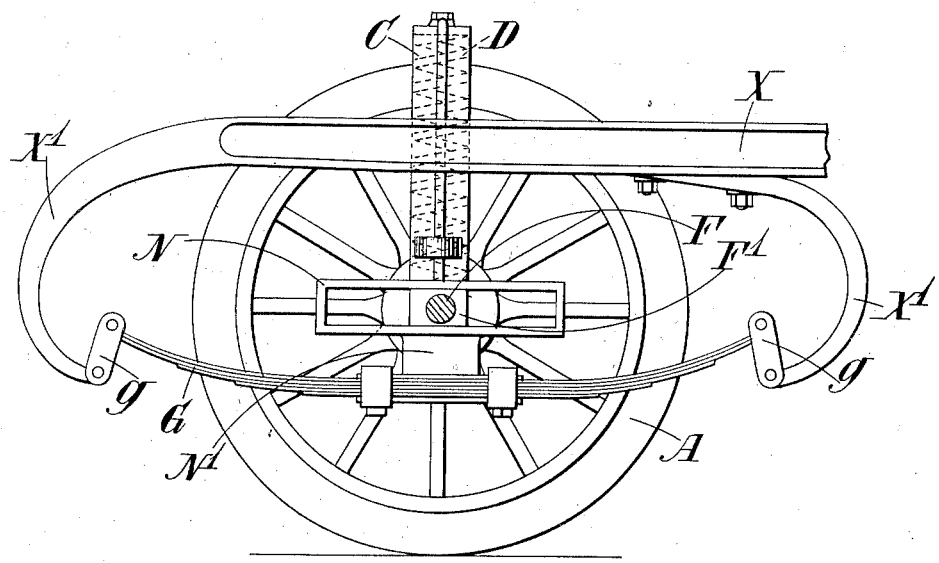
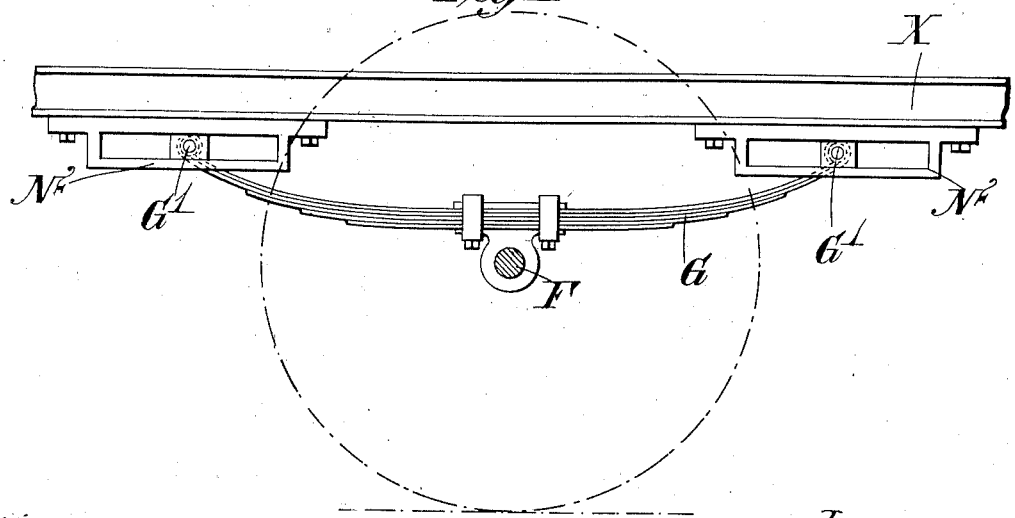
Witnesses:
Thomas Durant
Melville D. Church
Inventor:
Charles W. Fulton
by Church & Church
his Attys No. 879,160. PATENTED FEB. 18, 1908.
C. W. FULTON.
MOUNTING OF ROAD WHEELS FOR VEHICLES.
APPLICATION FILED MAY 15, 1905.
6 SHEETS—SHEET 5.
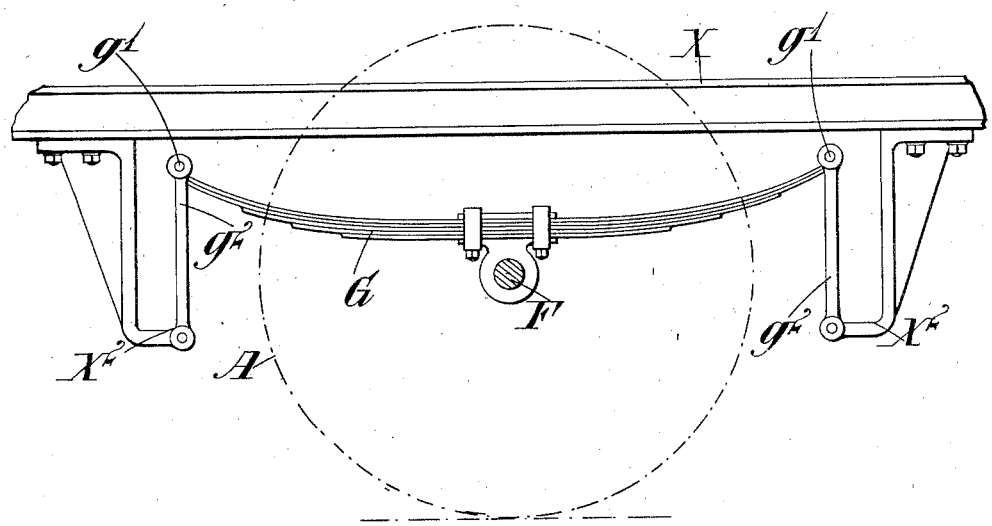
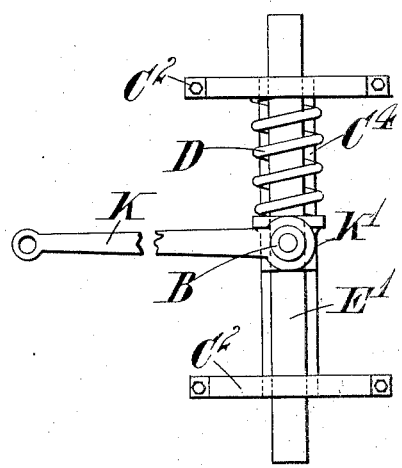 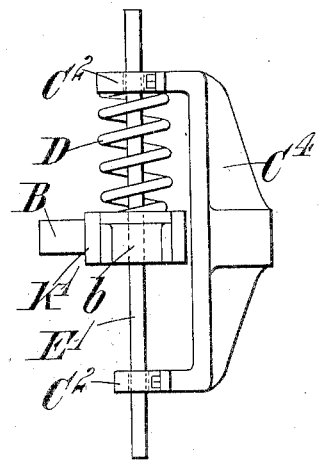
Witnesses
Thomas Durant
Melville D. Church
Inventor:
Charles W. Fulton
by Church & Church
his Attys No. 879,160. PATENTED FEB. 18, 1908.
C. W. FULTON.
MOUNTING OF ROAD WHEELS FOR VEHICLES.
APPLICATION FILED MAY 15, 1905.
6 SHEETS—SHEET 6.
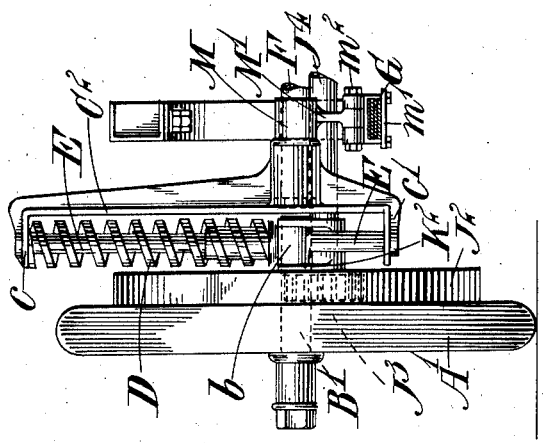
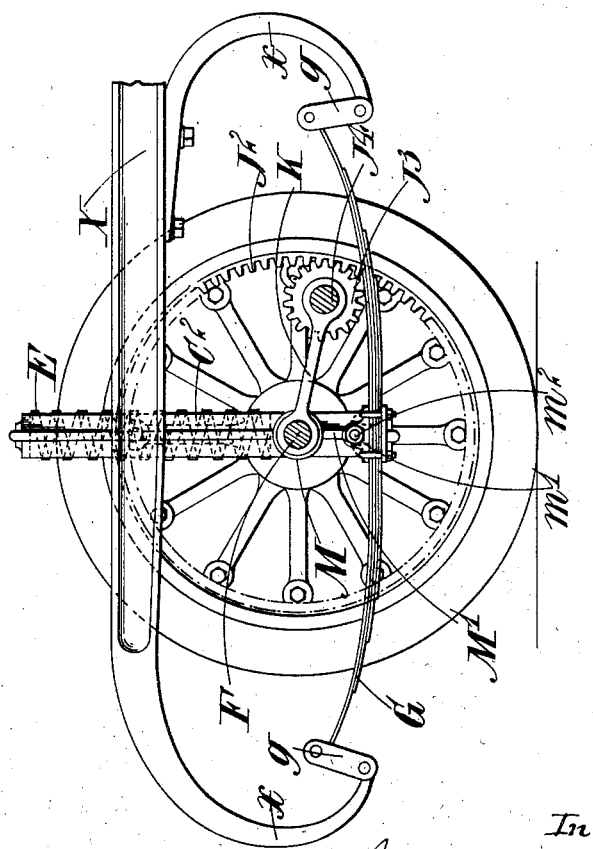
Witnesses
Thomas Durant
Melville D. Church
Inventor:
Charles W. Fulton,
By Church & Church
his Attys

UNITED STATES PATENT OFFICE.

CHARLES WM. FULTON, OF PAISLEY, SCOTLAND.

MOUNTING OF ROAD-WHEELS FOR VEHICLES.

No. 879,160.  Specification of Letters Patent.  Patented Feb. 18, 1908.

Application filed May 15, 1905. Serial No. 260,572.

*To all whom it may concern:*

Be it known that I, CHARLES WILLIAM FULTON, a subject of the King of Great Britain, residing at Paisley, Scotland, have invented certain new and useful Improvements in the Mounting of Road-Wheels for Vehicles, of which the following is a specification.

This invention relates to the mounting or suspension of road wheels for vehicles and is more particularly applicable to motor cars and similar vehicles.

According to this invention the road wheels are mounted on pin or stud axles carried in brackets relatively to which the wheels are permitted to move vertically, these supports being carried on axles or attached to the end frame or body of the vehicle and between the wheel axle and the bracket and also between the bracket and vehicle are disposed one or more springs or series of springs which relatively do not synchronize with each other in their movements. In addition to the vertical movement in the bracket or support the wheel axle is allowed a certain amount of fore and aft or lateral movement relatively to the body of the vehicle and either with or relatively to the bracket. When this lateral movement is permitted it may be limited by a radius rod which is telescopic or compressible but not extensible beyond a predetermined limit. The bracket or support in which the stud axle is mounted may be allowed to rock on its axle or in suitable bearings. The arrangement is such that should the wheels of the vehicle pass over an obstruction any oscillation or jolting is not transmitted to the body of the vehicle or to the people sitting therein the vehicle being supported in a very stable manner and the non-synchronizing of the springs causes the parts to come quickly but gradually to rest after passing over any obstruction.

To these ends the present invention consists in the novel constructions combinations and arrangements of parts all as hereinafter fully described and the novel features pointed out in the claims.

Referring to the drawings—Figures 1 and 2 are sectional elevations taken at right angles to each other showing one form of suspension in accordance with this invention where the lateral movement of the wheel relatively to the vehicle is obtained by a pivoted or rocking support; Fig. 3 is a sectional side elevation of a similar arrangement wherein one of the non-synchronizing springs is an elliptic or C-spring, Figs. 4 and 5 are sectional side elevations taken at right angles to each other showing the arrangement illustrated in Figs. 1 and 2 as preferably applied to a steering wheel, Fig. 6 is a side elevation partly in section showing the bracket attached to an axle instead of to the body of the vehicle, Fig. 7 is a front elevation, and Fig. 8 a side elevation showing further modified constructions, Fig. 9 is a side elevation showing a modification wherein the bracket is permitted to move laterally on the cross axle, Fig. 10 shows another modification for permitting a fore and aft movement, Fig. 11 illustrates a still further modified construction in which the springs on the cross axle are permitted to move in their supports, Figs. 12 and 13 are respectively front and side elevations of a further modified construction, Figs. 14 and 15 are side elevations taken at right angles to each other showing a convenient application of the invention to driving wheels, and Fig. 16 is a sectional elevation showing a preferred construction of compressible radius rod.

Referring first of all to Figs. 1 and 2, the stud axle B on which the road wheel is mounted has a sleeve or boss $b$ through which passes a guide pin $E^2$. The guide pin $E^2$ is provided at its lower end with an eye $e$ through which a pin on a bracket O passes. The upper end of the pin $E^2$ is adapted to move in a curved guide Q attached to the body of the vehicle and the sleeve $b$ is arranged to move on the pin $E^2$ between which and an adjustable collar $e^1$ on the upper end of the pin are disposed two springs $D^1$ $D^2$. The inner spring $D^1$ has one end resting against the hub $b$ and the other bearing against the inner end of a cup P which surrounds the pin $E^2$ and is free to move longitudinally thereon. This cup has a flange $p$ against which one end of the spring $D^2$ bears and the other end of this spring rests against the collar $e^1$. When the bracket O is rigidly connected to the vehicle frame as shown in the drawings the springs $D^1$ and $D^2$ are so constructed that they do not synchronize in their relative movements. The non-synchronizing action of the two springs must be more than normal, that is to say the vibrations or beats must cross each other to such an appreciable extent that the action will be to bring the parts gradually but quickly to rest after the wheel has passed over an obstruction or oscillations have otherwise been set up, thus avoiding any tendency of vibration or overturn of the vehicle especially if constructed on the lines of an omnibus.

In Figs. 1 and 2 the springs $D^1$ and $D^2$ are similar in construction but where the bracket is rigidly connected to the vehicle the spring $D^2$ may be replaced by elliptic-spring $D^*$, as shown in Fig. 3. If however the bracket O instead of being connected direct to the vehicle X is mounted on the ordinary cross axle then the spring between the axle and the body of the vehicle is constructed so as not to synchronize with the springs $D^1$ and $D^2$. It has been found that springs which vibrate in the proportions of 5 to 1 give satisfactory results.

In the construction shown in Figs. 4 and 5 the same arrangement as above described is shown applied to a steering wheel. On the end of the guide pin $E^2$ is mounted a roller $e^2$ which runs or bears on the sides of the guide Q so as to steady the pin and also to reduce friction. At the lower end the pin is mounted in a rocking support R which turns in a bearing $O^1$ in the bearing O and beneath this support is attached at $h$ the steering arm H which connects the pin to the steering mechanism. This arrangement allows the pin to rock and the wheel to move laterally of the vehicle without interfering with the steering mechanism. The part of the pin on which the sleeve B moves is in this case conveniently rectangular in cross section. The compression of the springs $D^1$ and $D^2$ will normally tend to keep the pin approximately upright.

Referring now to the construction shown in Fig. 6 a bracket C is mounted on a cross axle $F^2$. The axle $F^2$ does not extend across the vehicle but is pivoted at $F^3$ to a support on the vehicle frame the elliptic spring G being placed between this vehicle and the axle. In this case the pin E on which the stud axle B of the road wheel A moves is connected rigidly at both ends to the jaws $c$ $c^1$ of the bracket C a single spring D being placed between the hub $b$ of the stud axle and the upper jaw of the bracket; this spring is non-synchronous with the spring G.

Referring to the construction in Fig. 7, in this case the bracket C which carries the guide pin E on which the axle B moves is provided with arms $C^5$ which form bearings adapted to move on pins S. These pins S are mounted in brackets T secured to the vehicle frame or to the ordinary cross axle of the vehicle in any convenient manner. Between the bearings $C^5$ and the upper jaws of the bracket T are disposed springs U. The bracket T can be permitted to move fore and aft relatively to the vehicle or may be mounted to rock; or the bracket C may be allowed to rock in the bracket T.

A modified construction of the last described arrangement is shown in Fig. 8 where a single bracket and a single spring are employed instead of the two springs U and the two brackets T. In this case the bracket C is provided with a bearing $C^6$ adapted to move on a pillar $S^1$ supported in brackets $t$; or a single bracket secured to the vehicle. When these secondary brackets T or $t$ are rigidly secured to the vehicle then the springs do not synchronize with each other in their movements and where the secondary brackets are mounted on the ordinary cross axle the springs in the brackets do not synchronize with the spring between the axle and the vehicle.

In the construction shown in Fig. 9 the bracket C is mounted on a cross axle F extending from side to side of the vehicle and is arranged to move laterally relatively to the body of the vehicle. For this purpose the axle F is provided at or near each end with a bearing block $F^1$ adapted to slide in a guide N. The guide N has an extended part $N^1$ which is connected to an elliptic spring G in any convenient manner. The ends of the spring G are connected by links $g$ to brackets $X^1$ on the frame of the vehicle X. With this construction when the wheel passes over an obstruction it rises in the bracket C against the action of the spring D and the shaft F moves fore and aft relatively to the body of the vehicle.

Another method for providing for the lateral movement of the wheel relatively to the vehicle is shown in Fig. 10 where the spring G to which the cross axle F is attached has its ends connected at $g^1$ to links $g^2$, the other ends of which are pivotally attached to brackets $X^2$ on the vehicle.

Fig. 11 shows still another method of providing for the fore and aft movement of the wheel relatively to the vehicle and in this construction the spring G carries at each end bearing blocks $G^1$ connected to it in any appropriate manner and these blocks are arranged to move in guides $N^2$ rigidly secured to the frame of the vehicle.

In the modification illustrated in Figs. 12 and 13 the wheel axle B is connected to a pin $E^1$ of rectangular or similar cross section. This pin is arranged to move vertically in guides $c^2$ in the brackets $C^4$. These guides or bearings $c^2$ are elongated so that the pin $E^1$ in addition to its vertical movement therein may move laterally or fore and aft with the vehicle. A radius rod K is provided with a forked end $K^1$ and embraces the hub $b$ and if this radius rod is rigidly attached to the hub the pin as it moves upward against the action of the spring D is also tilted under the action of the radius rod. The radius rod may however be pivoted to the hub $b$ in which case the pin will move as above described without tilting.

In Figs. 14 and 15 the road wheel A¹ is a driven wheel and has attached to it an internally toothed ring J² with which meshes a toothed pinion J³ of a driven shaft J⁴. This shaft rotates in bearings and the cross axle F carries at either end a bracket C² which in this case provides for the lateral movement of the wheel axle by tilting. The wheel axle B¹ has attached to its hub or sleeve $b$ the forked end K² of a radius rod K the other end of which encircles the shaft J⁴. When the wheel rises in passing over an obstruction it will move round the shaft J⁴ and the bracket being rotatably mounted on the shaft F will be free to move as required. The ends of the spring G are connected to links $g$, see Fig. 14, and these in turn are pivoted to loops $x$ on the vehicle frame X thus permitting further lateral movement of the shaft F should this be necessary.

Fig. 16 illustrates a convenient construction of compressible radius rod which consists of two parts K¹ K² fitting one within the other. The hollow or cylindrical part K² of the rod is provided with an eye or opening $k$ by which it can be connected to the wheel hub or to the vehicle, a similar eye $k^1$ being provided on the other part of the rod. The part K¹ extends within the part K² and carries at or near its inner end a piston or enlargement K³ adjustably secured to the rod K¹ and between this and the inner end of the part K² is disposed a spring K⁴. The part K² has a removable end cap K⁵ through which the rod K¹ extends. In order to adjust the length of the rod there is fitted on the part K¹ a screw-threaded collar K⁶ having a flange $k^2$ bearing against the inner side of the cap K⁵. This flange prevents the part K¹ from being forced out too far, and therefore limits the maximum length of the radius rod. Shock or concussion is avoided should the rod be suddenly extended by rubber or other cushions K⁷. By adjusting the position of the enlargement or head K³ on the rod $k^1$, the compression on the spring K⁴ can be regulated. In its normal condition the length of the rod is such that the spring K⁴ is slightly in compression so that the rod will not begin to compress until a certain predetermined pressure is brought to bear on its opposite ends. When applied to a steering wheel—for instance—this compressible rod permits the wheel when it comes against an obstruction to move relatively to the vehicle, and the spring returns it to its normal position when the obstruction is passed. Or when applied to a driving wheel the force of the spring will act against the forward thrust of the road wheel. Obviously this spring connection on a driving wheel will aid greatly in starting the vehicle from rest.

What I claim as my invention and desire to secure by Letters Patent is:—

1. In a mounting or suspension for vehicle wheels the combination with a short axle for the wheel and a bracket in which the wheel axle can move vertically, of a cross axle carrying the brackets and non-synchronous springs located between the wheel axle and the bracket and between the bracket and its supporting cross axle to which latter one of the springs is connected and means permitting the wheel axle to move laterally relatively to the vehicle.

2. In a mounting or suspension for vehicle wheels the combination with a short independent axle for each wheel and a bracket in which each wheel axle can move vertically of a spring located between the wheel axle and the bracket a cross axle and springs non-synchronous with the first-mentioned spring connecting the bracket to the vehicle frame and means whereby the wheel axle and the bracket can move laterally relatively to the vehicle.

3. In a mounting or suspension for a vehicle wheel the combination with a spring-supported wheel axle and a bracket supporting the wheel axle of a compressible radius rod whereby the wheel axle is permitted to move fore and aft relatively to the vehicle.

4. In a mounting or suspension for a vehicle wheel the combination with a wheel rotated by toothed gearing of a bracket in which the wheel axle is suspended by a spring, means whereby the bracket can move fore and aft relatively to the vehicle and a radius rod connected to a cross axle carrying the bracket and to the driving shaft for the toothed pinion.

5. In a mounting or suspension for a vehicle wheel the combination with a bracket and a wheel axle spring-supported in the bracket of mechanism permitting the fore and aft movement of the bracket relatively to the vehicle frame substantially as and for the purpose described.

6. In a mounting or suspension for a vehicle wheel the combination with a bracket and a wheel axle spring-supported in the bracket of a spring-supported cross axle, blocks on the cross axle and bearings connecting the axle to a spring, means connecting the last-mentioned spring to the vehicle.

7. In a mounting or suspension for a vehicle wheel the combination with a bracket, a wheel axle spring-supported in the bracket, a cross axle suspended from the vehicle body by a spring, blocks on the ends of the latter spring and bearings on the vehicle body for the blocks.

8. In a mounting or suspension for a vehicle wheel the combination with a wheel axle of a guide pin connected to the axle, a spring between the axle and a bracket, springs supporting the bracket, means whereby the guide pin can move vertically and laterally in the bracket and a radius rod connected to the guide pin, substantially as described.

9. In a mounting or suspension for a vehicle wheel the combination with a wheel axle and a guide pin, a pivot for the guide pin, means whereby the wheel axle can slide on the guide pin, a spring between the wheel axle and the bracket, a pivoted arm attached to the lower end of the guide pin, a support in which the guide pin is free to turn, means rotatably connecting the support to the vehicle, and a guide for the upper end of the guide pin.

10. In a mounting or suspension for a vehicle wheel the combination with an axle for the wheel and a bracket, means whereby the axle can move vertically in the bracket, a spring between the wheel axle and the bracket, a spring non-synchronous with the first-mentioned spring located between the bracket and the vehicle, means whereby the wheel axle can move fore and aft relatively to the frame of the vehicle and a radius rod controlling the movements of the wheel axle, substantially as and for the purpose described.

11. In a mounting or suspension for a vehicle wheel the combination with a wheel axle and a bracket in which the wheel axle can move vertically, a spring between the wheel axle and the bracket, means whereby the bracket can move laterally relatively to the vehicle, a spring between the bracket and its support and a compressible but inextensible radius rod connected to the wheel axle or the bracket and means for regulating the length of the compressible radius rod substantially as and for the purpose described.

In testimony whereof I have signed my name to this specification in the presence of two subscribing witnesses.

CHAS. WM. FULTON.

Witnesses:
JAMES GILFILLAN,
JAS. BARCLAY.